US011976441B2

(12) United States Patent
Bae

(10) Patent No.: US 11,976,441 B2
(45) Date of Patent: May 7, 2024

(54) SWIVEL JOINT AND CONSTRUCTION MACHINE HAVING THE SAME

(71) Applicant: HD HYUNDAI INFRACORE CO., LTD., Incheon (KR)

(72) Inventor: Kwangsik Bae, Gwangmyeong-si (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 423 days.

(21) Appl. No.: 17/192,122

(22) Filed: Mar. 4, 2021

(65) Prior Publication Data

US 2021/0277625 A1 Sep. 9, 2021

(30) Foreign Application Priority Data

Mar. 5, 2020 (KR) .......................... 10-2020-0027517

(51) Int. Cl.
*F16L 39/06* (2006.01)
*E02F 9/00* (2006.01)
*E02F 9/12* (2006.01)
*E02F 9/22* (2006.01)

(52) U.S. Cl.
CPC .............. *E02F 9/123* (2013.01); *E02F 9/006* (2013.01); *E02F 9/2275* (2013.01); *F16L 39/06* (2013.01)

(58) Field of Classification Search
CPC . E02F 9/123; E02F 9/006; F16L 27/08; F16L 39/06; F16L 27/0828
See application file for complete search history.

(56) References Cited

U.S. PATENT DOCUMENTS

| 1,891,670 | A | * | 12/1932 | Ernst | ........................ | F16L 39/06 |
| | | | | | | 285/190 |
| 4,940,182 | A | * | 7/1990 | Heyne | ..................... | F16L 39/04 |
| | | | | | | 237/12.3 B |
| 2016/0369924 | A1 | * | 12/2016 | Boatman | ................. | F16L 39/06 |

FOREIGN PATENT DOCUMENTS

| CN | 107304568 A | 10/2017 | |
| CN | 110344468 A | 10/2019 | |
| DE | 29518335 U1 * | 2/1996 | |
| EP | 0396451 A2 * | 11/1990 | |
| EP | 3656931 A1 * | 5/2020 | ............. E02F 9/123 |
| JP | H06-228989 A | 8/1994 | |
| JP | 2000-008417 A | 1/2000 | |
| JP | 2004-244966 A | 9/2004 | |
| WO | WO-9902789 A1 * | 1/1999 | ............. B66C 23/84 |

(Continued)

OTHER PUBLICATIONS

Chinese Office Action dated Jun. 6, 2022, in connection with the Chinese Patent Application No. 202110242245.5.

(Continued)

*Primary Examiner* — Zachary T Dragicevich
*Assistant Examiner* — James A Linford
(74) *Attorney, Agent, or Firm* — Hauptman Ham, LLP

(57) ABSTRACT

Embodiments of the present disclosure may be directed to a swivel joint for connecting hydraulic oil between a lower body of a construction machine and an upper body rotatably supported by the lower body, the swivel joint including: a rotation support body including a first body supported by the lower body and a second body rotatably coupled to the first body and rotating together with the upper body when the upper body rotates; and a sensor supported by the rotation support body to detect rotation of the upper body.

15 Claims, 12 Drawing Sheets

(56) References Cited

FOREIGN PATENT DOCUMENTS

WO     WO-2005061805 A1 *   7/2005   ............. B66C 23/84
WO        2017/071982 A1     5/2017

OTHER PUBLICATIONS

Extended European Search Report dated Jul. 27, 2021, corresponding to European Application No. 21160875.7.

* cited by examiner

SWIVEL JOINT AND CONSTRUCTION MACHINE HAVING THE SAME

CROSS-REFERENCE TO RELATED APPLICATION

This application claims priority under 35 U.S.C. §119 to Korean Patent Application No. 10-2020-0027517, filed on Mar. 5, 2020, in the Korean Intellectual Property Office (KIPO), the disclosure of which is incorporated by reference herein in its entirety.

Technical Field

Embodiments of the present disclosure relate to a swivel joint and a construction machine including the same, and more particularly, to a swivel joint equipped with a sensor for detecting a relative rotation angle of an upper body and a lower body and a construction machine including the swivel joint.

Background Art

In general, a swivel joint between an upper body and a lower body of a construction machine allows a hydraulic oil to be connected to (e.g., associated with) a hydraulic device and a device using the hydraulic oil installed at the upper body and the lower body, respectively. Specifically, the hydraulic oil communicates through the inside of the swivel joint and flows to the upper body or the lower body.

In a conventional swivel joint, a connector connected to hydraulic lines is disposed at an upper portion, and there is a problem in that a connecting member such as a separate bending joint is required to connect the hydraulic lines from the connector and evenly arrange them in the upper body.

The upper body is supported by the lower body, and a swing sensor detects a relative angle between the upper body and the lower body and transmits it to a controller of the construction machine. In a conventional construction machine, the swing sensor is installed at a portion where relative rotation between the upper body and the lower body is performed, and thus other components should be separated or removed for maintenance and repair of the swing sensor. That is, there is a difficulty in that an operator has to remove other components installed at the upper body or the lower body therefrom in order to access the swing sensor.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments of the present disclosure may be directed to a swivel joint installed with a sensor for detecting a relative rotation angle between an upper body and a lower body, and a construction machine including the same.

An embodiment provides a swivel joint for connecting hydraulic oil between a lower body of a construction machine and an upper body rotatably supported by the lower body, the swivel joint including: a rotation support body including a first body supported by the lower body and a second body rotatably coupled to the first body and rotating together with the upper body when the upper body rotates; and a sensor supported by the rotation support body to detect rotation of the upper body.

In some embodiments, the sensor may include: a detector rotating together with the second body; and a relative detector supported by the lower body and providing relative rotation information between the upper body and the lower body to the detector.

In some embodiments, the swivel joint may further include: a second through hole defined inside the second body; and a guide pipe disposed in the second through hole and supporting the relative detector.

In some embodiments, the swivel joint may further include: a securing bracket configured to support position of the relative detector.

In some embodiments, the swivel joint may further include: a support including a spacer member disposed in parallel in a longitudinal direction of the second body and configured to form an installation space for the detector and the relative detector disposed above the second body.

In some embodiments, the support may further include: a base member between the second body and the spacer member and connecting the second body and the detector.

In some embodiments, the swivel joint may further include: a rotation support supported to the second body by the spacer member and configured to rotate together with the upper body when the upper body rotates.

In some embodiments, the securing bracket may include: a first protrusion having a securing through hole defined therein, wherein at least a portion of the first protrusion is inserted into a second detection through hole defined inside the relative detector; a bracket support surface connected to the first protrusion and supporting one surface of the relative detector neighboring the second detection through hole; and a second protrusion protruding from the bracket support surface in a direction opposite to the first protrusion.

In some embodiments, the rotation support may include: a rotation body coupled to the support; an electric part guide member rotatably coupled to the rotation body and capable of having an electric line disposed therein; and a securing support supported on an outer circumferential surface of the electric part guide member and having a support coupling groove coupled to the second protrusion.

In some embodiments, the guide pipe may be disposed in the second through hole, the first detection through hole, and the second detection through hole, and is coupled to the securing bracket.

In some embodiments, the securing bracket may further include a third protrusion formed by protruding an inner circumferential surface of the securing through hole toward a center portion of the securing through hole, and the guide pipe further has a coupling groove formed at one end portion of the guide pipe and coupled to the third protrusion.

In some embodiments, the guide pipe may be characterized in that one side thereof is supported by the securing bracket and the other side thereof is detachably supported by the first body.

In some embodiments, one end portion of the first protrusion may protrude toward the detector outside the second detection through hole.

In some embodiments, the rotation support body may further include a hydraulic guide portion to be coupled to a hydraulic line, on an outer circumferential surface of an area of the second body protruding upward with respect to an upper body bottom surface of the upper body supported by the lower body.

An embodiment provides a construction machine including: a lower body; an upper body supported by the lower body; a swing device disposed on the lower body to rotatably support the upper body; and a swivel joint disposed at a center portion of the swing device, the swivel joint including: a rotation support body including a first body supported by the lower body and a second body rotatably coupled to the first body and having one area disposed to protrude with respect to one surface of the upper body to rotate together with the upper body when the upper body rotates; a sensor supported by the second body protruding with respect to one surface of the upper body and configured to detect rotation of the upper body; and a hydraulic guide portion configured to couple a hydraulic line to an outer circumferential surface of an area of the second body.

In some embodiments, the upper body may include: an upper body bottom surface supported by the lower body; a pair of upper body vertical surfaces spaced apart from each other with respect to the swivel joint, the pair of upper body vertical surfaces protruding from the upper body bottom surface and disposed to cross the upper body bottom surface; and an upper body reinforcement surface connecting the pair of upper body vertical surfaces to each other and disposed so that an area thereof overlaps the swivel joint when viewed from above over the upper body.

In some embodiments, the swivel joint may further include: a guide pipe including one side disposed to penetrate along a longitudinal direction of the second body, and another side detachably supported by the first body, the guide pipe detachable in a lower direction of the upper body bottom surface during maintenance of the sensor.

An embodiment provides a swivel joint for connecting hydraulic oil between a lower body of a construction machine and an upper body rotatably supported by the lower body, the swivel joint including, a rotation support body including a first body supported by the lower body, and a second body rotatably coupled to the first body and rotating together with the upper body when the upper body rotates; a detector having a first detection through hole defined therein, and rotating together with the second body; a relative detector having a second detection through hole defined therein, and supported by the lower body to provide relative rotation information between the upper body and the lower body to the detector; a second through hole defined inside the second body; a securing bracket partially inserted inside the second detection through hole to support position of the relative detector; and a guide pipe at least a portion of which is inserted into the second through hole, the first detection through hole, and the second detection through hole, wherein the guide pipe may include one side supported by the securing bracket inserted into the second detection through hole and another side detachably coupled to the first body.

The foregoing is illustrative only and is not intended to be in any way limiting. In addition to the illustrative aspects, embodiments and features described above, further aspects, embodiments and features will become apparent by reference to the drawings and the following

BRIEF DESCRIPTION OF THE DRAWINGS

A more complete appreciation of the present disclosure will become more apparent by describing in detail embodiments thereof with reference to the accompanying drawings, wherein.

DETAILED DESCRIPTION

Figure 1:
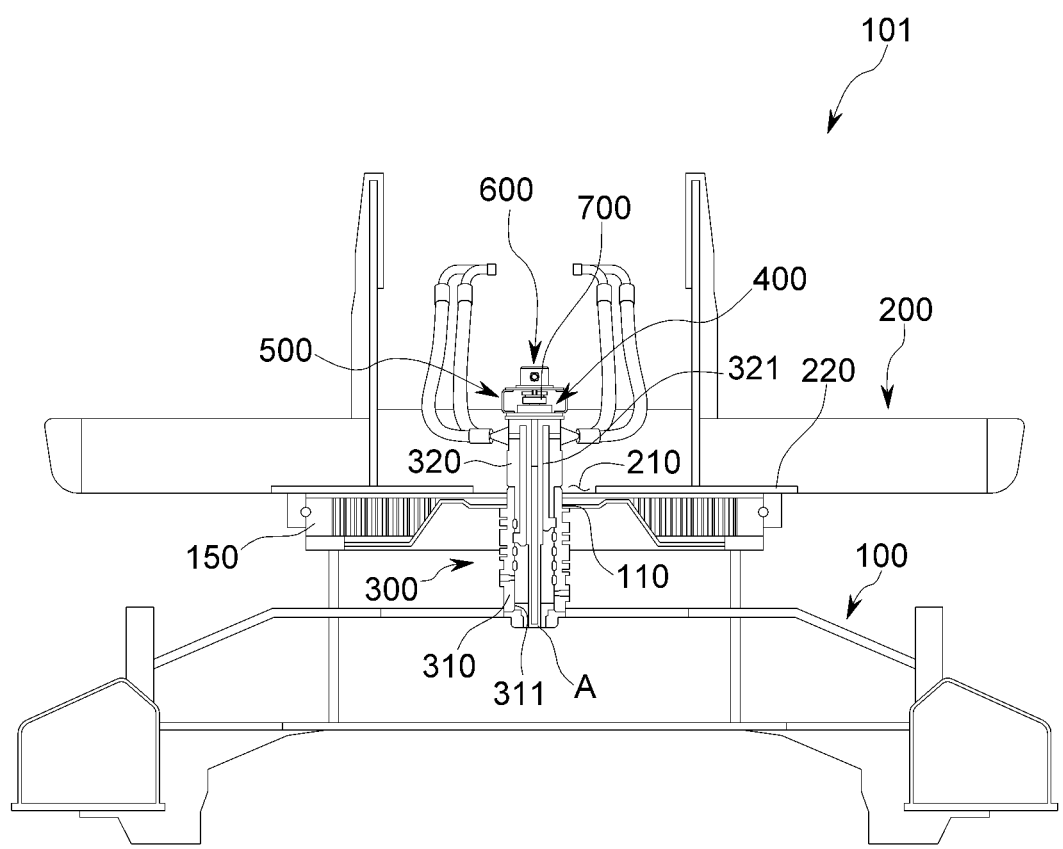
FIG. 1 is a cross-sectional view illustrating a swivel joint and a construction machine installed with the swivel joint according to an embodiment of the present disclosure.

Hereinafter, embodiments of the present disclosure will be described in detail with reference to the accompanying drawings so that those of ordinary skill in the art may easily implement the present disclosure. The present disclosure may be implemented in various different forms and is not limited to embodiments described herein.

It is to be understood that the drawings are schematic and have not been drawn to scale. Relative dimensions and ratios of parts in the drawings are illustrated exaggerated or reduced in size for clarity and convenience in the drawings, and any dimensions are merely exemplary and not limiting. In addition, the same structural elements or parts appearing in two or more drawings are used with the same reference numerals to indicate similar features.

Embodiments of the present disclosure specifically represent a preferred embodiment of the present disclosure. Accordingly, various variations of the illustration are expected. Therefore, embodiments are not limited to a specific shape in the illustrated area, and includes, for example, a modification of the shape by manufacturing.

Hereinafter, a swivel joint 102 according to an embodiment of the present disclosure will be described with reference to FIGS. 1 to 12.

Figure 2:
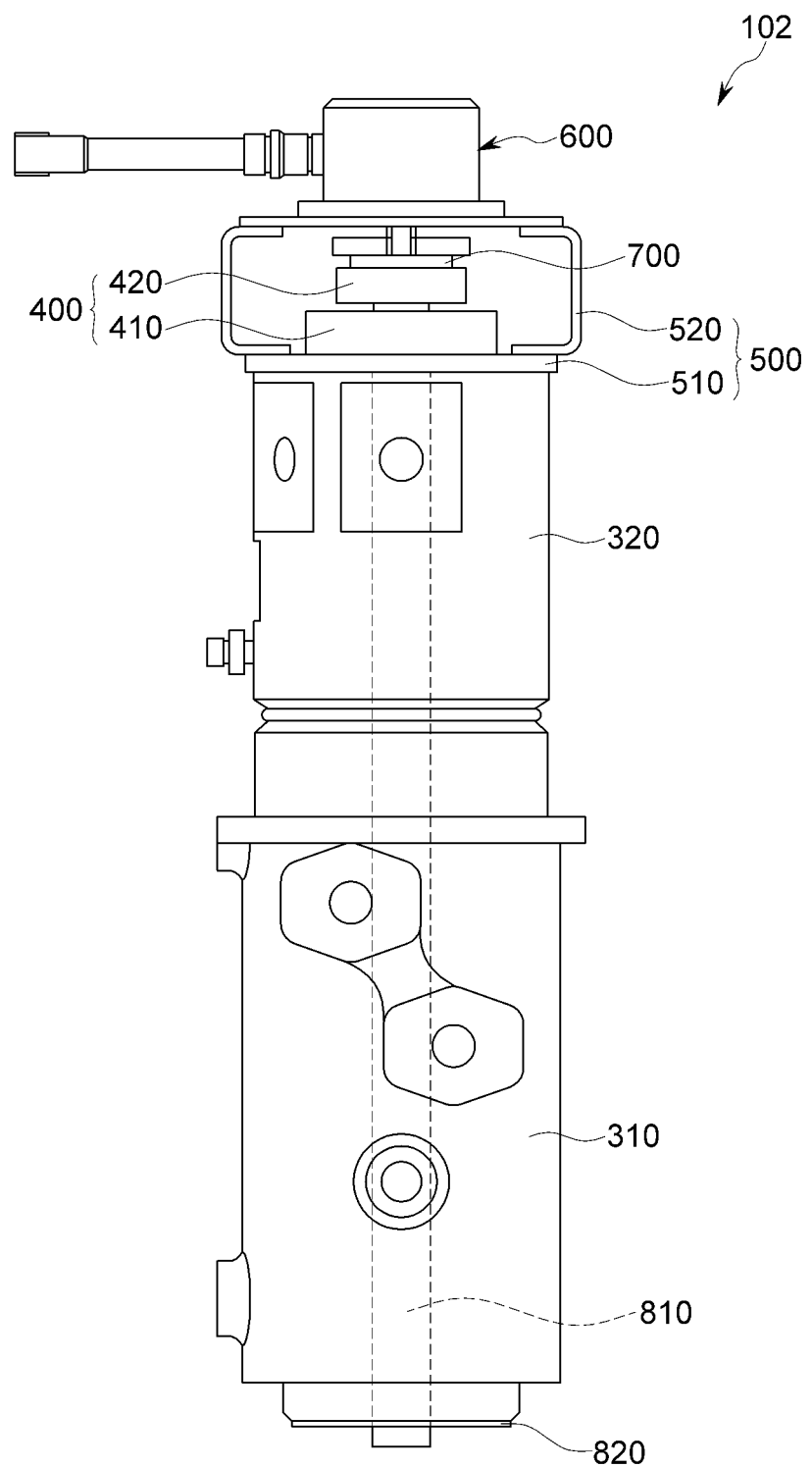
FIGS. 2 to 6 illustrate exploded views illustrating the swivel joint and a sensor.

A swivel joint 102 is installed at a construction machine 101 as illustrated in FIGS. 1 and 2. Specifically, the construction machine 101 includes an upper body 200 and a lower body 100. The lower body 100 rotatably supports the upper body 200. The swivel joint 102 connects (e.g., associates) a hydraulic line between the upper body 200 and the lower body 100. That is, the swivel joint 102 connects the hydraulic line between the lower body 100 which is secured and the upper body 200 which rotates relative to the lower body 100.

The swivel joint 102 according to an embodiment of the present disclosure, as illustrated in FIGS. 1 and 2, includes a rotation support body 300, including a first body 310 and a second body 320, and a sensor 400.

The first body 310 is supported by the lower body 100. Specifically, the first body 310 may be formed in an approximately "cylindrical" shape and formed with an internal hollow to form a first through hole 311. That is, at least a portion of the first body 310 may be fixedly coupled to the lower body 100. A lower body through hole 110 may be defined in the lower body 100. In addition, a portion of the first body 310 may pass through the lower body through hole 110 and be supported by the lower body 100.

The second body 320 is rotatably coupled to the first body 310. In addition, the second body 320 rotates together with the upper body 200 when the upper body 200 rotates. Specifically, at least a portion of the second body 320 is inserted and disposed in the first through hole 311 of the first body 310. In addition, an outer circumferential surface of a portion of the second body 320 may be rotatably coupled to an inner circumferential surface of the first through hole 311 of the first body 310. In addition, one side of the second body 320 may be disposed outside the first body 310, and the other side of the second body 320 may be rotatably disposed in the first through hole 311 of the first body 310.

An upper body through hole 210 may be defined (e.g., formed) in the upper body 200. The second body 320 may be disposed in the upper body through hole 210 and supported by the upper body 200 to rotate together with the upper body 200 when the upper body 200 rotates. Specifically, the upper body through hole 210 may be defined in the upper body 200 facing the lower body through hole 110.

The sensor 400 detects rotation of the upper body 200. In addition, the sensor 400 is supported by the rotation support body 300. Specifically, the sensor 400 may detect swing of the upper body 200 with respect to the lower body 100. The sensor 400 may be supported above or on the second body 320.

Accordingly, the swivel joint 102 according to an embodiment of the present disclosure includes the sensor 400 that detects rotation of the upper body 200, and thus when maintenance of the sensor 400 is required, an operator may access the upper body 200 and may check the sensor 400 efficiently.

Figure 3:
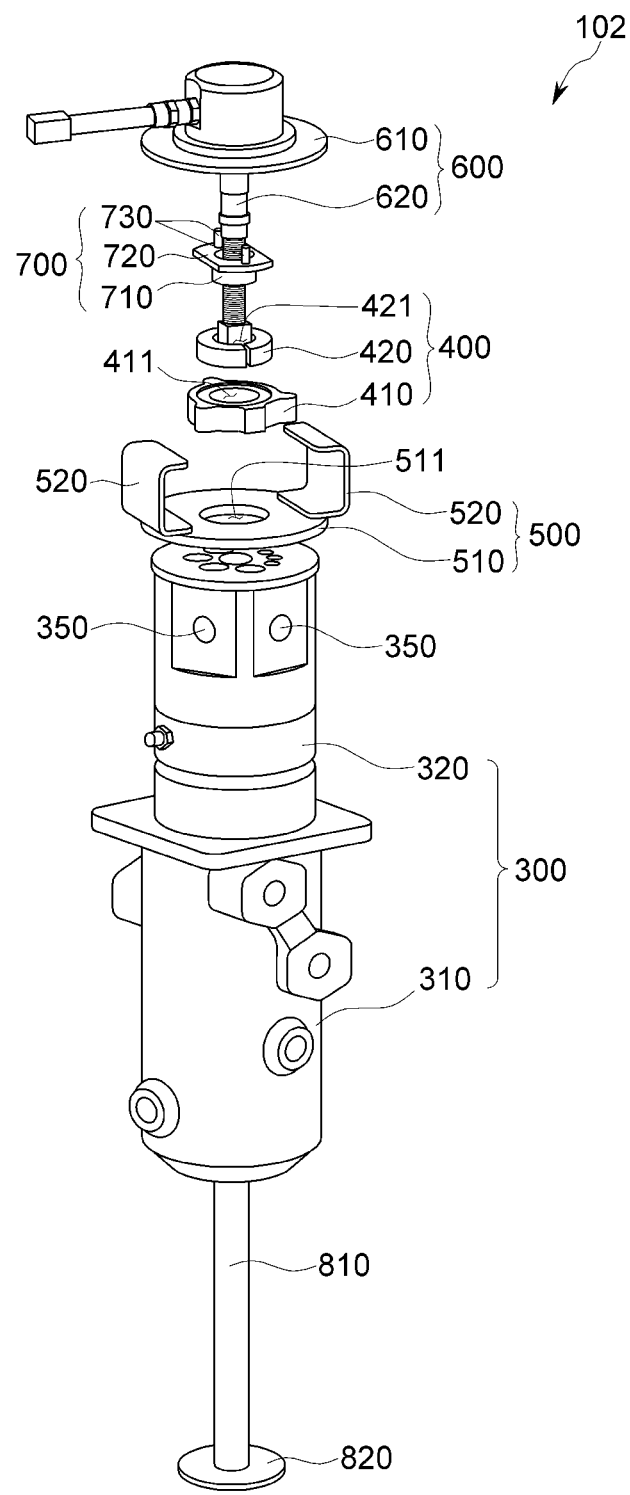
Figure 4:
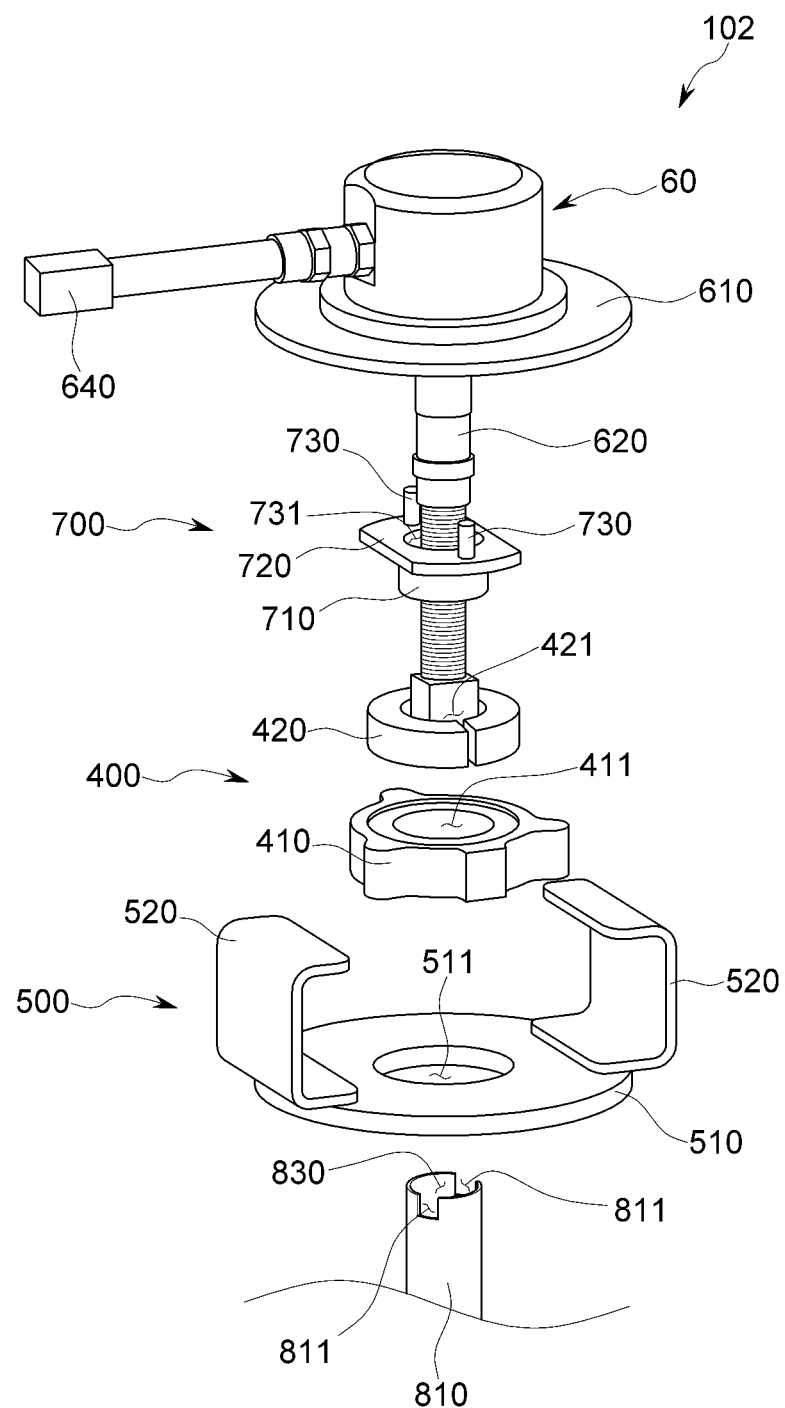
Figure 5:
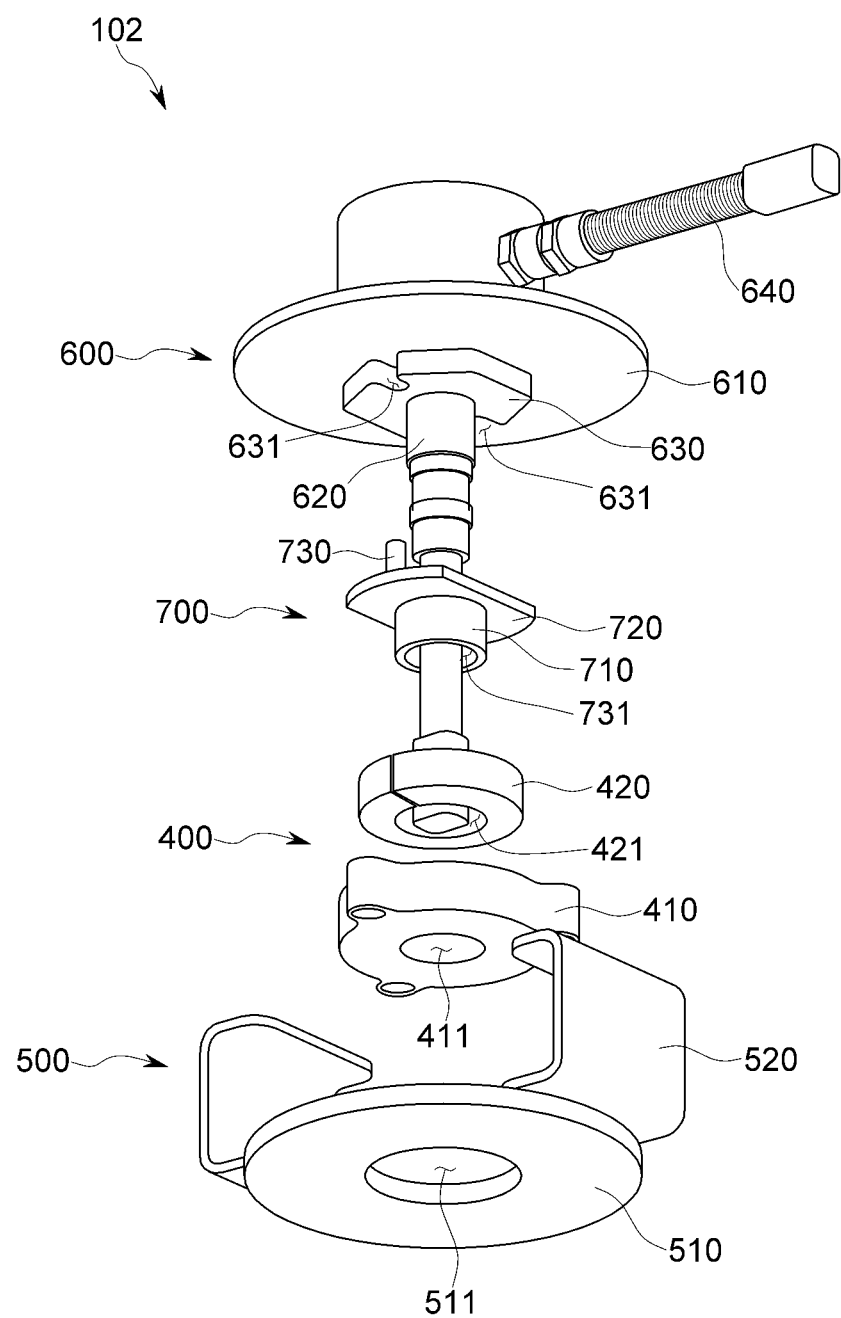
Figure 6:
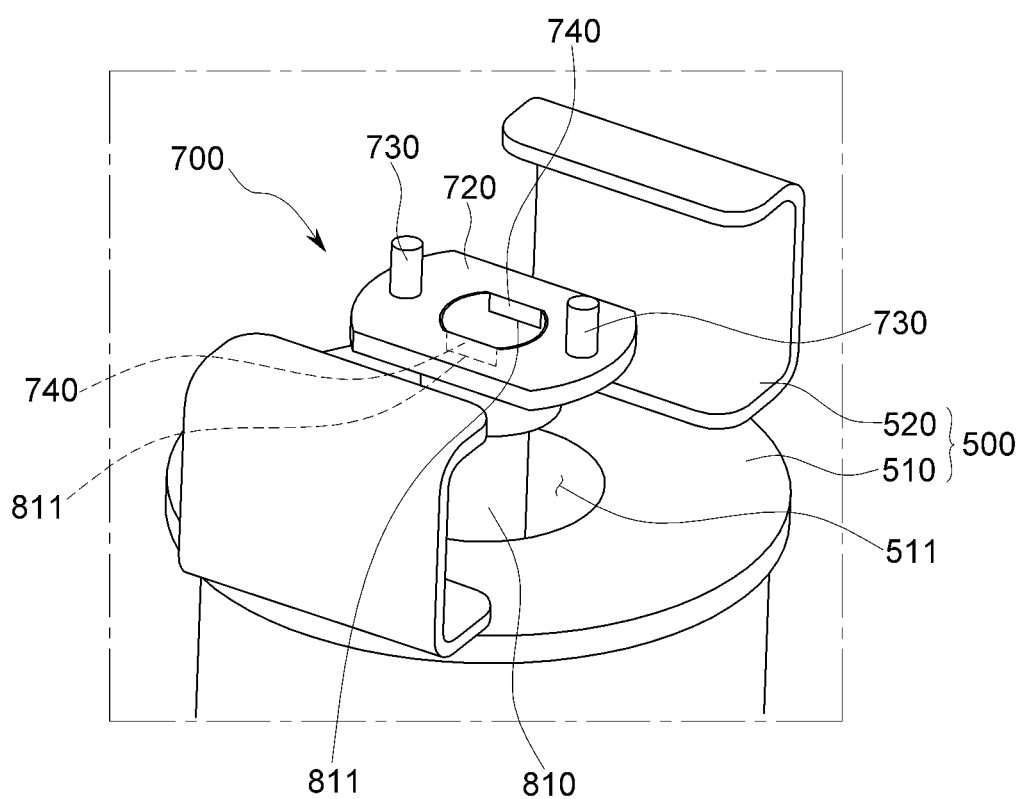
Figure 7:
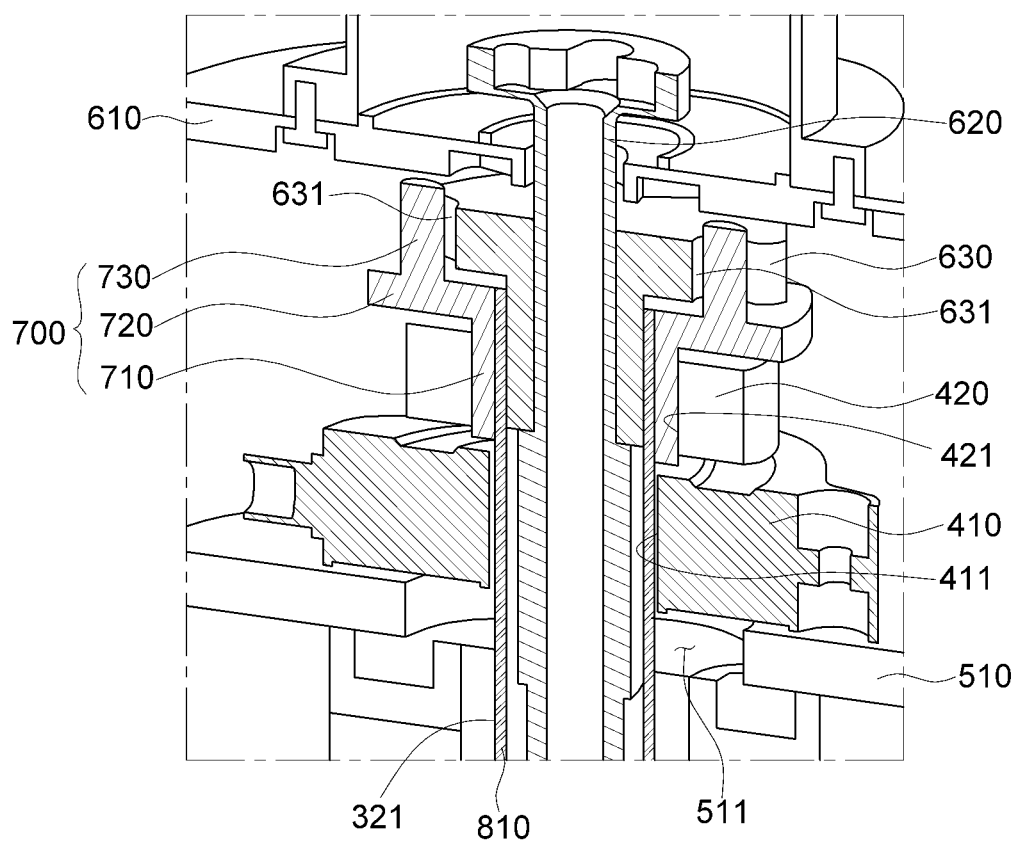
FIG. 7 is a cross-section illustrating components coupled to the sensor.

In addition, the sensor 400 according to an embodiment of the present disclosure may include a detector 410 and a relative detector 420 as illustrated in FIGS. 3 to 5.

The detector 410 may rotate together with the second body 320. The detector 410 may rotate together with the second body 320, when the upper body 200 rotates.

The relative detector 420 may be supported by the lower body 100 to provide, to the detector 410, relative rotation information between the upper body 200 and the lower body 100. The relative detector 420 may be supported by the lower body 100 to provide rotational position information of the lower body 100, and the detector 410 may rotate together with the upper body 200 when the upper body 200 rotates, and thus may detect relative rotation angle information between the upper body 200 and the lower body 100 based on the position information provided by the relative detector 420.

For example, the relative detector 420 may be supported by the lower body 100 to provide magnetism to the detector 410.

Specifically, the relative detector 420 may be supported and secured by the lower body 100, and the detector 410 which rotates together with the upper body 200 when the upper body 200 rotates detects magnetism information of the relative detector 420, thereby detecting a swing angle of the relative detector 420 with respect to the secured lower body 100. For example, the relative detector 420 may be a magnetic body. Alternatively, the detector 410 may be of another configuration capable of detecting a relative rotation angle between the lower body 100 and the upper body 200.

In addition, the detector 410 may be disposed more adjacent to the second body 320 than the relative detector 420 is thereto. That is, the relative detector 420 may be disposed above or on the detector 410.

Specifically, the detector 410 may detect a change in magnetic property generated by the relative detector 420.

Information detected by the detector 410 may be transmitted to a controller (not illustrated) so that a relative rotation angle of the upper body 200 and the lower body 100 may be calculated.

In addition, the swivel joint 102 according to an embodiment of the present disclosure may further include a rotation support 600. The rotation support 600 rotates together with the upper body 200 when the upper body 200 rotates. Specifically, the rotation support 600 may be disposed above or on the sensor 400. In addition, the support 500 according to an embodiment of the present disclosure may include a spacer member 520, as illustrated in FIGS. 3 to 5.

The sensor 400 is disposed in the support 500. In addition, the support 500 connects between the second body 320 and the rotation support 600. Specifically, the support 500 may connect the second body 320 and the rotation support 600 so that they rotate together when the upper body 200 rotates.

The spacer member 520 may support the rotation support 600 to be spaced apart from each other in one direction. The spacer member 520 may support the rotation support 600 so that the second body 320 and a portion of the rotation support 600 rotate together. In addition, the spacer member 520 may form an installation space such that the sensor 400 is installed in the support 500. For example, the spacer member 520 may be disposed in a direction parallel to a longitudinal direction of the second body 320 to form the installation space for the sensor 400.

Specifically, the spacer member 520 may be formed in a pair to include a first frame and a second frame.

The first frame may be bent so that one end is disposed adjacent to the second body 320. In addition, the first frame may be bent so that another end faces one surface of the rotation support 600. In addition, an intermediate portion between one end and the other end of the first frame may be disposed in a direction parallel to a longitudinal direction of the second body 320.

For example, the first frame may be formed in an approximately "C" shape.

The second frame may be formed in the substantially same shape as the first frame and may be disposed on a base member 510 so that concave intermediate portions of the approximate "C" shapes face each other around the detector 410, while being spaced apart from each other.

Accordingly, the spacer members 520 may support the rotation support 600 which is spaced apart from the second body 320 along the longitudinal direction of the second body 320 so that the rotation support 600 may rotate together with the second body 320. In addition, the spacer member 520 may form a space such that the sensor 400 is disposed above or on the second body 320 along the longitudinal direction of the second body 320.

In addition, the support 500 according to an embodiment of the present disclosure may further include the base member 510 as illustrated in FIGS. 3 to 5.

The base member 510 may be disposed between the second body 320 and the detector 410 to support the second body 320 and the detector 410 to rotate together.

The base member 510 may be disposed on the second body 320 to connect the second body 320 and the detector 410. Specifically, the base member 510 may be disposed between the second body 320 and the detector 410 so that the detector 410 is supported by the second body 320.

For example, the base member 510 may be formed in an annular shape on one side of the second body 320 to support the detector 410. Specifically, the base member 510 may have a base hole 511 defined in the center thereof. That is, one surface of the base member 510 may be disposed to face one side of the second body 320, and another surface of the base member 510 may be disposed to face the detector 410.

In addition, the base member 510 may be detachably coupled to the second body 320. Accordingly, the detector 410 may be detachably coupled to the base member 510. Accordingly, the detector 410 may be coupled to the second body 320 by the base member 510 and rotate together with the upper body 200 when the upper body 200 rotates.

One end portion of the first frame may be disposed to face another surface of the base member 510. The second frame may also be disposed to face the first frame and be connected to the base member 510.

In addition, the swivel joint 102 according to an embodiment of the present disclosure may further include a securing bracket 700 as illustrated in FIGS. 3 to 7.

The securing bracket 700 may be disposed between the detector 410 and the rotation support 600. In addition, the securing bracket 700 may support position of the relative detector 420. Specifically, the securing bracket 700 may support the relative detector 420 so that it may not rotate along the upper body 200.

In addition, the securing bracket 700 according to an embodiment of the present disclosure may include a first protrusion 710, a bracket support surface 720 and a second protrusion 730, as illustrated in FIGS. 3 to 7.

The first protrusion 710 may have a securing through hole 731 defined therein. A second detection through hole 421 may be defined inside the relative detector 420. Specifically, the second detection through hole 421 may be defined in the relative detector 420 along a longitudinal direction of the second body 320. At least a part of the first protrusion 710 may be inserted into the second detection through hole 421 of the relative detector 420. That is, an outer circumferential surface of the first protrusion 710 may face an inner circumferential surface of the second detection through hole 421. Accordingly, the first protrusion 710 may support the relative detector 420.

The securing through hole 731 may be defined in the securing bracket 700 to be elongated along a longitudinal direction of the second body 320.

The bracket support surface 720 may be connected to the first protrusion 710 and may support one surface of the relative detector 420 neighboring the second detection through hole 421. Specifically, the relative detector 420 may be disposed above or on the detector 410, and the bracket support surface 720 may be disposed parallel to a surface of the relative detector 420 that is opposite to a surface of the relative detector 420 facing the detector 410 so as to support one surface of the relative detector 420. That is, the bracket support surface 720 may be formed to extend from the first protrusion 710 in an outer circumferential direction.

For example, the bracket support surface 720 may be formed to extend from the first protrusion 710 elongatedly in one radial direction of the securing through hole 731.

Accordingly, the bracket support surface 720 may face and support one surface of the relative detector 420 disposed relatively far from the detector 410, and the first protrusion 710 may be inserted in the second detection through hole 421 and support an inner surface of the second detection through hole 421.

The second protrusion 730 may be formed to protrude from the bracket support surface 720 in a direction opposite to the first protrusion 710. In addition, the second protrusion 730 may include a pair of protrusions disposed on the bracket support surface 720 to be spaced apart from each other with respect to the securing through hole 731. Specifically, the first protrusion 710 may be formed on one surface of the bracket support surface 720, and one surface of the bracket support surface 720 and the first protrusion 710 may support the relative detector 420.

In addition, the second protrusion 730 including a pair of protrusions may be formed on another surface of the bracket support surface 720 opposite to the one surface of the bracket support surface 720, protruding in a direction opposite to the first protrusion 710, and the pair of protrusions are spaced apart from each other about the securing through hole 731. That is, the bracket support surface 720 is formed to extend elongatedly in one radial direction of the securing through hole 731, and the pair of protrusions may be formed thereon.

In addition, the securing through hole 731 may penetrate and be defined from the first protrusion 710 to the bracket support surface 720.

In addition, the rotation support 600 according to an embodiment of the present disclosure, as illustrated in FIGS. 3 to 7, may include a rotation body 610, an electric part guide member 620, and a securing support 630. For example, the rotation support 600 may be a rotation connector or a slip ring that guides an electric line between the upper body 100 and the lower body 200 to pass therethrough and prevents entangling thereof.

The rotation body 610 may be coupled to the support 500. Specifically, the rotation body 610 may be coupled to the base member 510 by the spacer member 520. In addition, an external electric line connector 640 which may be coupled to an electric line located at the upper body 200 outside the rotation body 610 may be disposed at the rotation body 610. Accordingly, the rotation body 610 may rotate together with the external electrical line connector 640, together with the upper body 200.

The electric part guide member 620 may be rotatably coupled to the rotation body 610. Specifically, one end portion of the electric part guide member 620 may be rotatably coupled to the rotation body 610. For example, a bearing or a bearing bush may be disposed between one end portion of the electric part guide member 620 and a center portion of the rotation body 610 to support the rotation body 610 to be rotatable. That is, the rotation body 610 may rotate about the electric part guide member 620.

In addition, an electric line may be disposed in the electric part guide member 620. Specifically, the electric part guide member 620 may be disposed along a length direction of the second body 320 from the rotation body 610 toward the second body 320. That is, the electric part guide member 620 may be disposed elongatedly in one direction along the length direction of the second body 320.

The securing support 630 may be coupled to the securing bracket 700. Specifically, it may be supported on an outer circumferential surface of the electric part guide member 620. In addition, the securing support 630 may be disposed on one side of the rotation body 610 facing the securing bracket 700.

In addition, a support coupling groove 631 may be defined in the securing support 630. Specifically, a pair of support coupling grooves 631, the number of which is equal to the number of the second protrusions 730, may be formed in the securing support 630 to be coupled to the second protrusions 730.

For example, the support coupling groove 631 may be formed to be concave toward a center direction from opposite ends of the securing support 630.

Accordingly, the bracket support surface 720 may be formed to extend elongatedly in one radial direction of the securing through hole 731 so that a pair of protrusions are formed thereon, and the second protrusions 730 including the pair of protrusions may be coupled to the support coupling grooves 631, respectively.

Accordingly, the securing bracket 700 may be coupled to the securing support 630.

In addition, the swivel joint 102 according to an embodiment of the present disclosure, as illustrated in FIGS. 3 to 7, may further include a second through hole 321, a first detection through hole 411, and a guide pipe 810.

The second through hole 321 may be defined in a hollow shape inside the second body 320. Specifically, the second through hole 321 may be formed at a center portion of the second body 320 along a longitudinal direction of the second body 320.

The first detection through hole 411 may be defined inside the detector 410. Specifically, the first detection through hole 411 may be defined so that the second detection through hole 421 and the base hole 511 communicate with each other. That is, the first detection through hole 411 may be defined through a center portion of the detector 410 along a longitudinal direction of the second body 320.

The guide pipe 810 may be formed elongatedly in one direction. In addition, the guide pipe 810 may have a guide hole 830 defined therein in a hollow shape. In addition, the guide pipe 810 may be disposed in the first through hole 311, the first detection through hole 411, and the second detection through hole 421.

The guide pipe 810 may be coupled to the securing bracket 700.

Specifically, at least a portion of the guide pipe 810 may be inserted and disposed inside the second body 320. In addition, the rest of the guide pipe 810 may be inserted inside the first detection through hole 411, the second detection through hole 421 and the securing through hole 731. That is, the rest of the guide pipe 810 may be disposed to protrude outside the second body 320.

Figure 12:
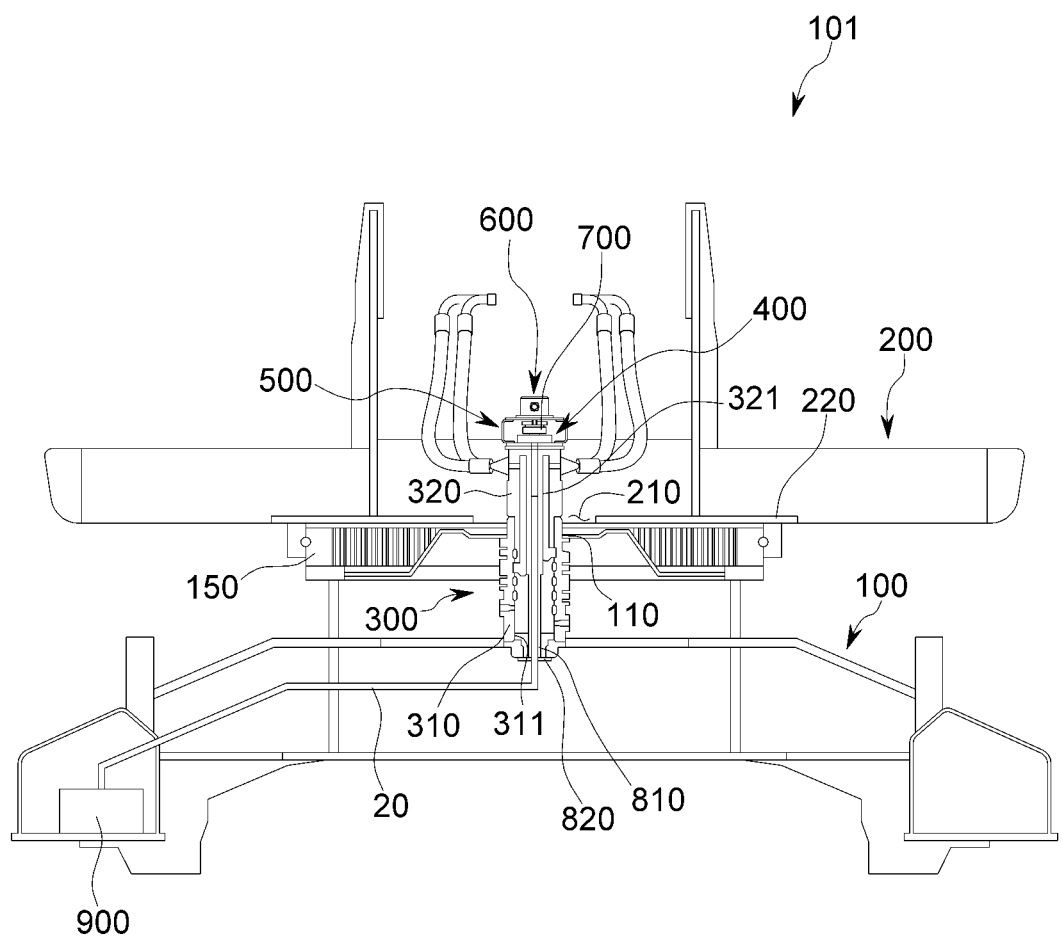
FIG. 12 illustrates a construction machine when a tension detector is installed.

For example, since the guide hole 830 is defined in the guide pipe 810, an electric line may be disposed through the lower body 100 and the upper body 200 along a length direction of the guide pipe 810. Specifically, as illustrated in FIG. 12, a traveling body tension detector 900 for detecting a tension of the traveling body disposed on the lower body 100 may allow the electric line 20 to be disposed at the upper body 200 through the guide hole 830. Accordingly, damage due to entangling of the electric line 20 may be effectively prevented.

Figure 8:
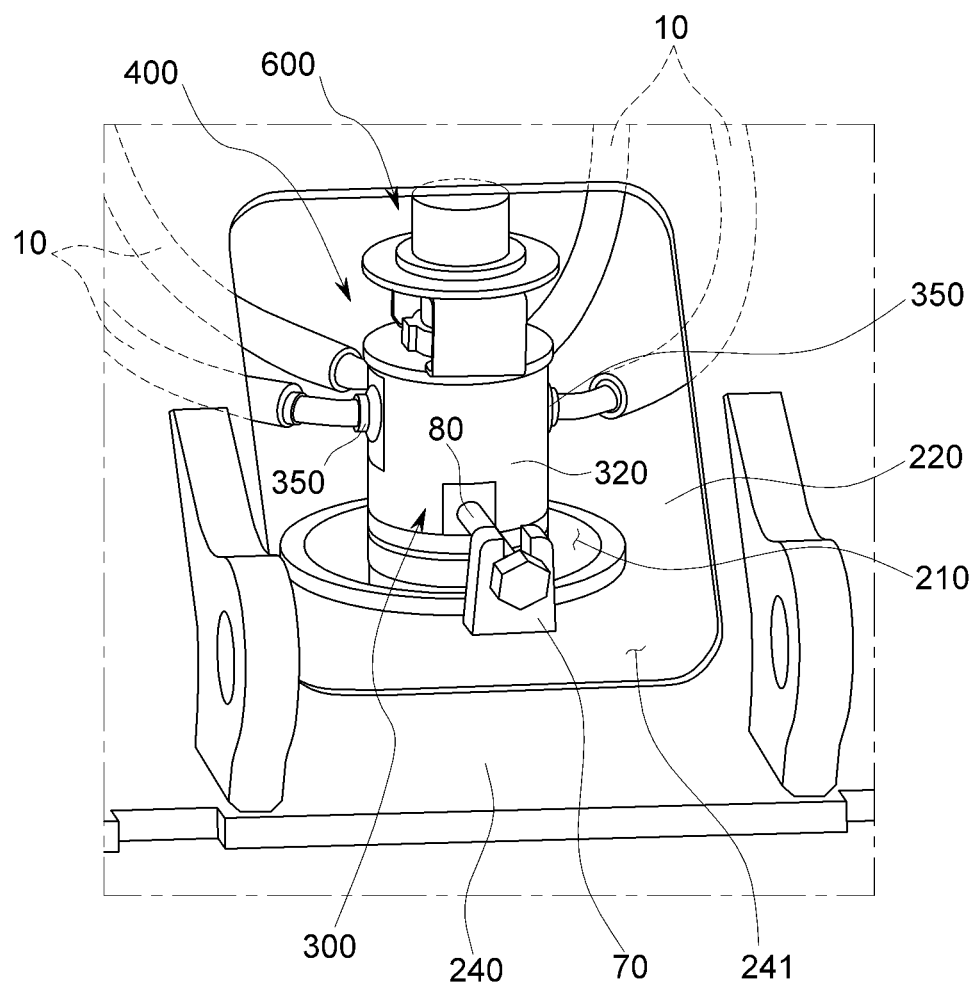
FIG. 8 is a bottom perspective view illustrating part A of FIG. 1.

In addition, the guide pipe 810 may include one end portion coupled to the securing bracket 700 and the other end portion supported by the first body 310. Specifically, as illustrated in FIG. 8, the other end portion of the guide pipe 810 may be coupled to the guide support 820 in an annular shape through welding. In addition, the guide support 820 may be detachably coupled to a lower portion of the first body 310.

Accordingly, the securing bracket 700 coupled to the guide pipe 810, the relative detector 420 coupled to the securing bracket 700, and the slip ring securing member and the electric part guide member 620 coupled to the securing bracket 700 may be supported on the lower body 100. That is, the securing bracket 700 coupled to the guide pipe 810, the relative detector 420 coupled to the securing bracket 700, and the securing support 630 and the electric part guide member 620 coupled to the securing bracket 700 may not rotate when the upper body 200 rotates.

In addition, the securing bracket 700 of the swivel joint 102 according to an embodiment of the present disclosure may further include a third protrusion 740.

The third protrusion 740 may be formed on an inner circumferential surface of the securing through hole 731 to protrude toward a center portion of the securing through hole 731. The third protrusion 740 may include a pair of facing protrusions disposed to protrude in a direction in which the pair of protrusions become adjacent to each other in the securing through hole 731.

In addition, the guide pipe 810 according to an embodiment of the present disclosure may further include a coupling groove 811.

The coupling groove 811 may be defined at one end portion of the guide pipe 810 to be coupled to the third protrusion 740. Specifically, the coupling groove 811 may be defined by forming one end portion of the guide pipe 810 to be concave in a longitudinal direction of the guide pipe 810, so that the third protrusion 740 may be inserted and coupled thereto.

That is, the guide pipe 810 may limit rotation of the securing bracket 700. Accordingly, some components of the relative detector 420 and the rotation support 600 supported by the securing bracket 700 may not rotate together when the upper body 200 rotates. Accordingly, the detector 410 which rotates together when the upper body 200 rotates may detect a swing angle of the upper body 200 with respect to the relative detector 420 supported by the lower body 100.

The third protrusion 740 may be coupled to the coupling groove 811 in such a way, and thus when the swivel joint 102 is disassembled for inspection or replacement of the sensor 400 disposed in the swivel joint 102, components thereof may be readily removed (e.g., detached, separated, etc.).

In addition, regarding coupling with the securing bracket 700 and the securing support 630, which may be somewhat unstable due to a small diameter of the guide pipe 810, the second protrusion 730 which includes the pair of protrusions disposed on the bracket support surface 720 extending in one radial direction of the securing through hole 731, may be effectively coupled to the securing support 630. Accordingly, the guide pipe 810 may allow the first body 310 and the relative detector 420 to be stably supported together.

In addition, one end portion of the first protrusion 710 according to an embodiment of the present disclosure may be disposed to protrude toward the detector 410 outside the second detection through hole 421.

One end portion of the first protrusion 710 may pass through the second detection through hole 421 and extend toward the detector 410. Specifically, one end portion of the first protrusion 710 facing one end portion of the detector 410 may be disposed to protrude toward the detector 410 along a central axis direction of the second detection through hole 421. That is, a protruding length of the first protrusion 710 may be formed longer than a height of the second detection through hole 421.

One end portion of the first protrusion 710 disposed outside the second detection through hole 421 to face the detector 410 may maintain a spacing distance between the detector 410 and the relative detector 420.

Accordingly, damage to the detector 410 or damage to the relative detector 420 caused by contact between the detector 410 and the relative detector 420 positioned on the detector 410 may be effectively prevented by one end portion of the first protrusion 710.

Figure 9:
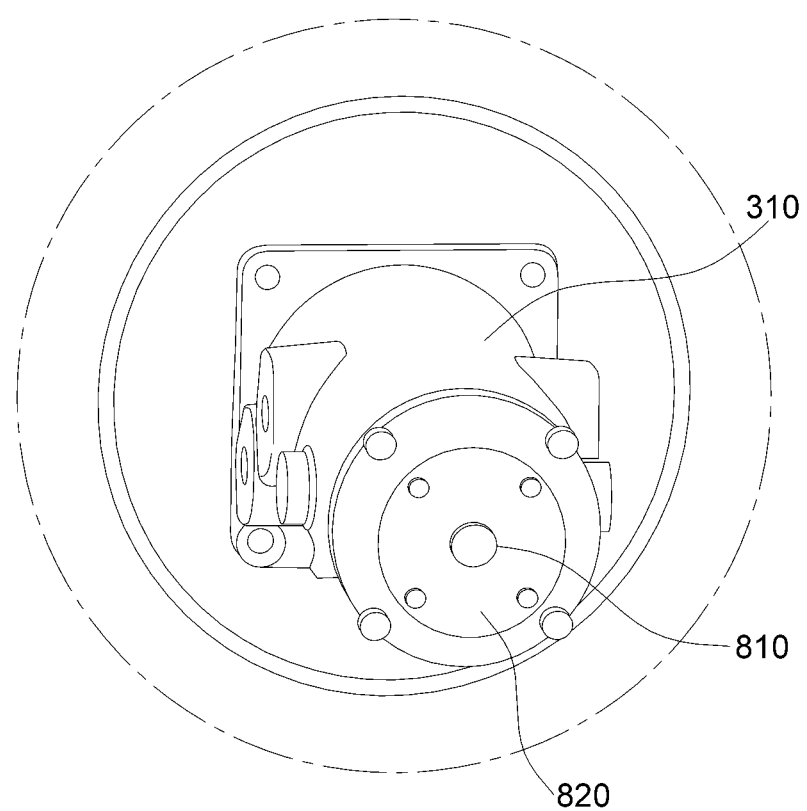
FIG. 9 is a partial perspective view illustrating an upper body at which a swivel joint is installed.

In addition, the rotation support body 300 according to an embodiment of the present disclosure may further include a hydraulic guide portion 350 as illustrated in FIG. 9.

The lower body 100 supports the upper body 200. Specifically, one area of the rotation support body 300 may protrude upward with respect to a bottom surface 220 of the upper body 200 supported on one surface of the lower body 100. One area of the second body 320 may be disposed to protrude upward with respect to the bottom surface 220 of the upper body 200. A hydraulic guide portion 350 allowing a hydraulic line 10 to be coupled thereto may be disposed on an outer circumferential surface of one area of the second body 320.

Accordingly, as the hydraulic guide portion 350 is formed on an outer circumferential surface of an area of the second body 320 that protrudes upward with respect to the bottom surface 220 of the upper body 200, the hydraulic line 10 coupled to the hydraulic guide portion 350 rotate together with the upper body 200 according to the rotation of the upper body 200 such that it may effectively transfer hydraulic oil without being entangled.

In addition, as the hydraulic guide portion 350 is formed on the outer circumferential surface of an area of the second body 320 protruding upward with respect to the bottom surface 220 of the upper body 200, the operator may easily perform maintenance work on the hydraulic line 10 on the upper body 200 without the need to disassemble the entire swivel joint 10 during maintenance of the hydraulic line 10 connected to the hydraulic guide portion 350.

Hereinafter, a construction machine 101 in which the swivel joint 102 is installed according to an embodiment of the present disclosure will be described with reference to FIGS. 1 to 12.

A construction machine 101 includes a lower body 100 on which a traveling body such as a caterpillar (e.g., track) or wheel required for traveling is installed and an upper body 200 that is disposed on the lower body 100 to support, for example, a cabin in which a worker is boarded and an engine. In addition, in the construction machine 101, a swivel joint 102 for guiding movement of hydraulic oil between the lower body 100 and the upper body 200 is installed between the lower body 100 and the upper body 200. Specifically, the swivel joint 102 transfers hydraulic oil from a pump installed at the upper body 200 to a traveling motor installed at the lower body 100 or relays the hydraulic oil to between the upper body 200 and the lower body 100 to recover the hydraulic oil supplied to the driving motor. In addition, the swivel joint 102 provides a movement path of the electric line, so that even if relative rotation between the upper body 200 and the lower body 100 occurs, entangling of the electric line may be effectively prevented.

The swivel joint 102 may be inserted and supported in the upper body through hole 210 defined in the upper body 200 and the lower body through hole 110 defined in the lower body 100.

In addition, the construction machine 101 includes a swing device 150. As illustrated in FIG. 1, the swing device 150 may rotate the upper body 200 and the lower body 100 relative to each other. That is, the swing device 150 may rotatably support the lower body 100 that supports the upper body 200 so that the upper body 200 is rotatable.

For example, the swing device 150 may be an inner ring having teeth formed therein, installed at an installation area of the lower body 100. A plurality of inner gears disposed inside the inner ring by a motor, which is not illustrated, are operated, thereby rotating the upper body 200 with respect to the lower body 100 so that rotation occurs.

The above-described lower body through hole 110 may be defined at a center portion of this inner ring.

A sensor 400 may be installed at the swivel joint 102. When the swivel joint 102 includes a first body 310 supported by the lower body 100 and a second body 320 at least a portion of which is inserted and rotatably supported in the first body 310 and the rest protrudes with respect to one surface of the upper body 200, the sensor 400 may be disposed above or on the second body 200. Specifically, the sensor 400 may detect a relative rotation angle between the upper body 200 and the lower body 100.

For example, the detector 410 rotates together with the upper body 200 by the support 500, and the relative detector 420 is supported to the first body 310 by the guide pipe 810 to be supported by the lower body 100. Accordingly, the detector 410 may detect a relative rotation angle of the upper body 200 and the lower body 100.

Figure 10:
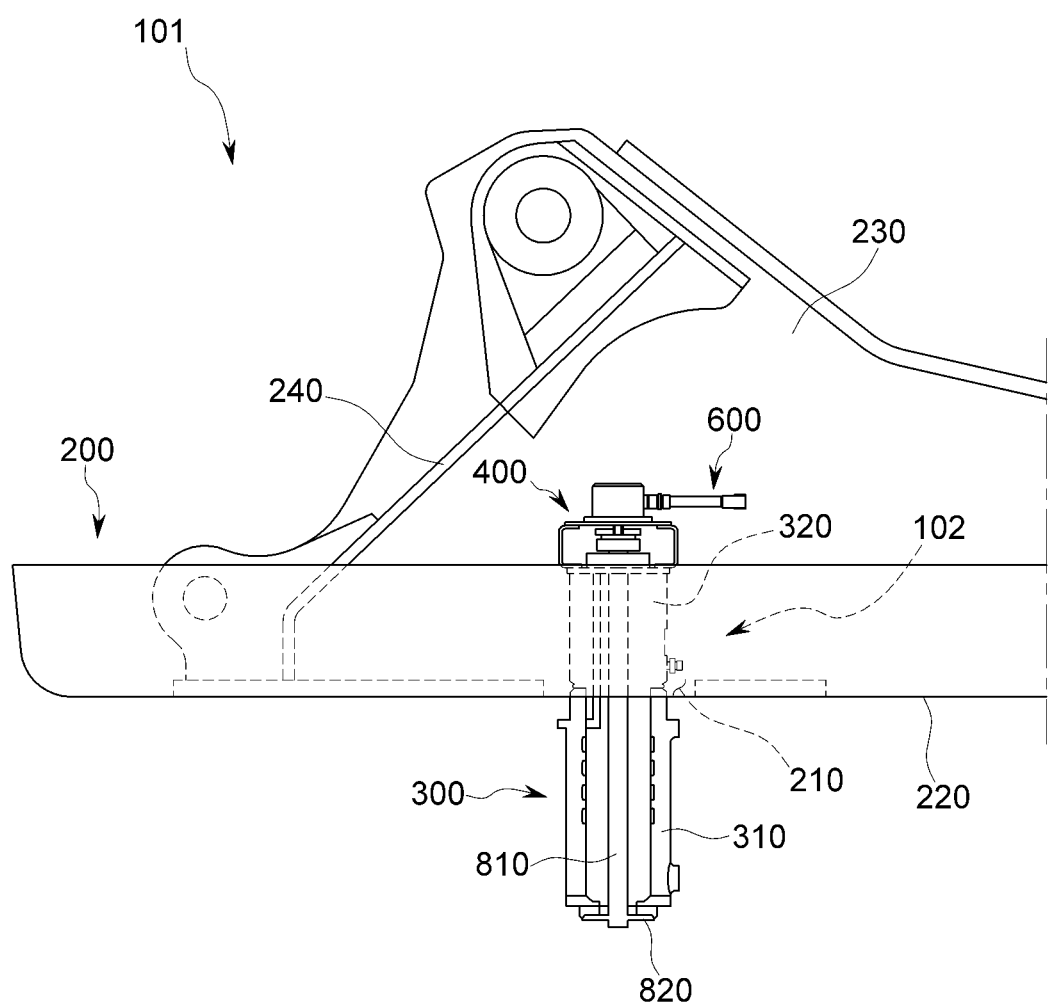
FIG. 10 is a partial side view illustrating an upper body at which a swivel joint is installed.
Figure 11:
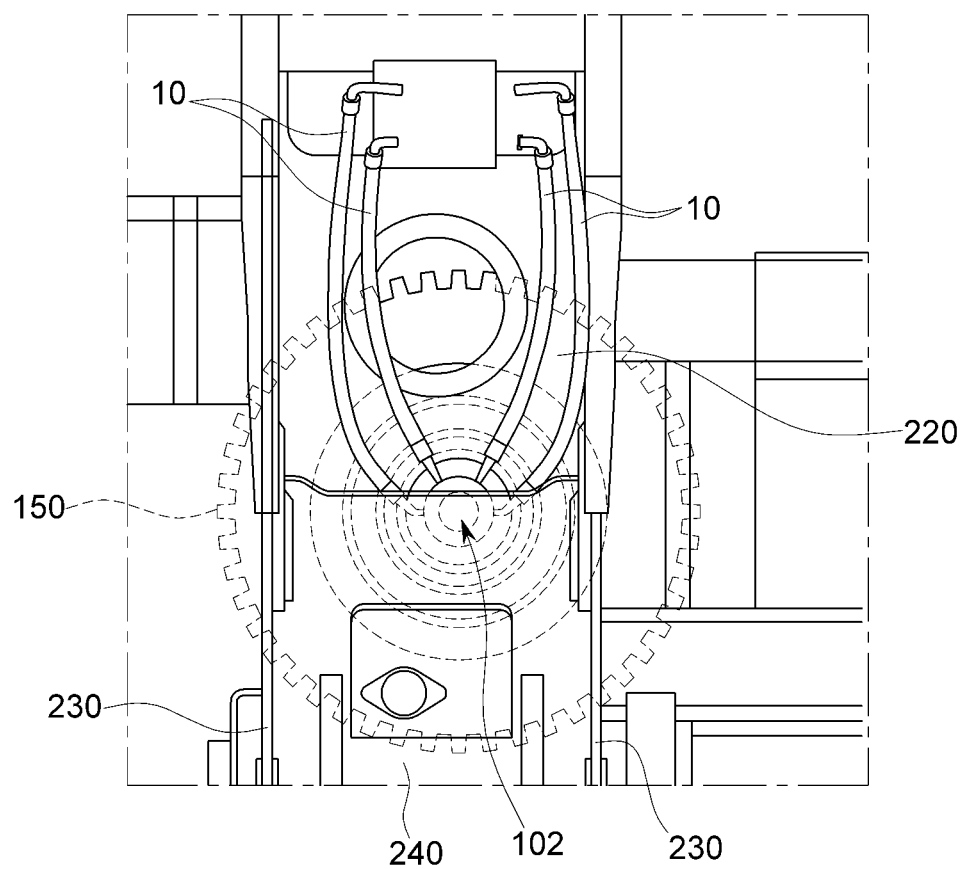
FIG. 11 is a partial plan view illustrating an upper body at which a swivel joint is installed.

The upper body 200 includes an upper body bottom surface 220, an upper body vertical surface 230, and an upper body reinforcing surface 240, as illustrated in FIGS. 9 to 11.

An upper body through hole 210 is defined in the upper body bottom surface 220. Specifically, the upper body bottom surface 220 may be a surface facing the inner ring installed at the lower body 100. The upper body through hole 210 may be formed in a surface facing the lower body through hole 110. That is, the upper body bottom surface 220 may be a lowermost surface of the upper body 200 that faces the lower body 100.

The upper body vertical surface 230 may be disposed on the upper body bottom surface 220. In addition, the upper body vertical surface 230 may be disposed in a direction perpendicular to the upper body bottom surface 220. Specifically, the upper body vertical surface 230 may be arranged in a direction parallel to a longitudinal direction of the swivel joint 102.

In addition, the upper body vertical surface 230 may be formed as a pair spaced apart from the swivel joint 102 on the upper body bottom surface 220. That is, the upper body vertical surface 230 may be formed as a pair spaced apart from each other with respect to the upper body through hole 210.

Specifically, the upper body vertical surface 230 may include an area in which a boom is installed when the construction machine 101 is an excavator.

The upper body reinforcement surface 240 may be disposed between the pair of upper body vertical surfaces 230 spaced apart from each other to connect the pair of upper body vertical surfaces 230. In addition, the upper body reinforcing surface 240 connects between the upper body vertical surfaces 230 to help prevent deformation of the upper body vertical surface 230 against a load in a direction crossing a height direction of the upper body vertical surface 230. For example, an opening hole 241 may be defined in the upper body reinforcing surface 240 to reduce a weight of the upper body reinforcing surface 240.

In addition, the upper body reinforcing surface 240 is disposed to be inclined in one direction between the pair of upper body vertical surfaces 230. Specifically, in the upper body reinforcement surface 240 connecting the pair of upper body vertical surfaces 230, the upper body reinforcement surface 240 adjacent to the upper body bottom surface 220 may be one side of the upper body reinforcement surface 240. In addition, in the upper body reinforcement surface 240 connecting the pair of upper body vertical surfaces 230, the upper body reinforcement surface 240 farther from the upper body bottom surface 220 than one side of the upper body reinforcement surface 240 may be the other side of the upper body reinforcement surface 240. In addition, as illustrated in FIGS. 9 to 11, when the upper body bottom surface 220 is viewed from above (top view), the upper body reinforcement surface 240 may be disposed so that it may become adjacent to the upper body through hole 210, from one side of the upper body reinforcement surface 240 to the other side of the upper body reinforcement surface 240.

Accordingly, when the upper body bottom surface 220 is viewed from above (top view), an area of the other side of the upper body reinforcement surface 240 may be disposed to overlap at least a part of the swivel joint 102 or the upper body through hole 210.

In addition, the construction machine 101, as illustrated in FIG. 9, may further include a rotation connector 80 having one side supported by the second body 320 and extending in an outer circumferential direction of the second body 320, and a connection support 70 disposed at the upper body 200 to support the other side of the rotation connector 80 in an insertion manner. By coupling of the rotation connector 80 and the connection support 70, the second body 320 may also rotate when the upper body 200 rotates. That is, when the upper body 200 rotates, the second body 320 may rotate together by coupling of the rotation connector 80 and the connection support 70.

When the upper body 200 rotates with respect to the lower body 100, position of the first body 310 supported by the lower body 100 is in a state of being secured by the lower body 100. In addition, the relative detector 420 supported to the first body 310 and the securing bracket 700 by the guide pipe 810 is supported by the lower body 100. In such an embodiment, the second body 320 which is partially inserted into the first body 310 and rotates together with the upper body 200 rotates. In addition, the detector 410 supported to the second body 320 by the support 500 rotates with the upper body 200 when the upper body 200 rotates. Accordingly, the detector 410 rotates together with the upper body 200 with respect to the relative detector 420 which has the same position as the lower body 100, and thus a relative angle between the lower body 100 and the upper body 200 may be detected.

In addition, the hydraulic lines 10 connected to the hydraulic guide portion 350 formed on an outer circumferential surface of the second body 320 which is rotated when the upper body 200 rotates may also rotate together, so that the upper body 200 may prevent the hydraulic lines from being entangled as the upper body 200 rotates with respect to the lower body 100. In addition, the swivel joint 102 may effectively connect (associate) flow of hydraulic oil to a hydraulic device installed at the upper body 200 and a driving motor installed at the lower body 100.

Accordingly, it is possible to arrange the hydraulic lines 10 evenly at various locations inside the upper body 200 by the hydraulic guide portion 350 formed on the outer circumferential surface of the second body 320. That is, the hydraulic guide portion 350 formed on the outer circumferential surface of the second body 320 may allow the hydraulic lines 10 to be effectively disposed in the upper body 200 on opposite sides of the swivel joint 102.

In addition, the guide hole 830 of the guide pipe 810 and the electric line connected to the external electric line connector 640 of the rotation body 610 may also rotate together with the rotation of the upper body 200. In addition, the rotation body 610 connected to the second body 320 by the support 500 may rotate together as the upper body 200 rotates. In such an embodiment, when the upper body 200 rotates, the external electric line connector 640 installed at the rotation body 610 may also rotate.

Specifically, the electric line arranged in the guide hole 830 may be connected to the external electric line connector 640. In addition, the electric line connected to the lower body 100 may be disposed in the guide hole 830. In addition, the external electric line connector 640 and the electric line disposed on the upper body 200 may be connected to each other. Accordingly, the electric line disposed on the upper body 200 and the electric line disposed on the lower body 100 may be connected by the external electric line connector 640.

Accordingly, it is possible to effectively prevent entangling of the electric line connecting between the lower body 100 and the upper body 200 according to the rotation of the upper body 200.

In addition, since the sensor 400 is installed on the second body 320 of the swivel joint 102, the operator may easily access the sensor 400 for maintenance. Specifically, connection between the external electric line connector 640 installed at the rotation body 610 and the electric line may be released. Thereafter, the operator may remove the guide pipe 810 from the first body 310 for inspection of the sensor 400 installed at an upper portion of the swivel joint 102 and remove the support 500 from the second body 320. Accordingly, it is possible to easily access the sensor 400.

In such a case, by releasing a fastening member such as a bolt from the first body 310, the guide support 820 fastened thereto may be removed in a lower direction of the lower body 100. That is, the guide pipe 810 may be removed in a lower direction of the lower body 100, so that collision between the upper body reinforcing surface 240 and the guide pipe 810 may be effectively prevented. In addition, the coupling groove 811 of the guide pipe 810 is fitted with the third protrusion 740 of the securing bracket 700, so that the guide pipe 810 may be effectively removed without additional releasing of a fastening member. In other words, when accessing the sensor 400 for inspection or maintenance, the guide pipe 810 may be removed in the lower direction of the lower body 100 so that collision between the guide pipe 810 and the upper body 200 may be effectively prevented.

In such a configuration, in the swivel joint 102 according to an embodiment of the present disclosure, the sensor 400 is installed above or on the second body 320 so that a relative rotation angle of the upper body 200 and the lower body 100 may be effectively detected. In addition, the swivel joint 102 may be easily accessed for maintenance of the sensor 400 installed therein.

As set forth hereinabove, according to one or more embodiments of the present disclosure, a swivel joint and a construction machine including the swivel joint are equipped with a sensor capable of detecting a relative rotation angle between the upper body and the lower body, thereby improving the operator's accessibility for maintenance of the sensor.

Embodiments of the present disclosure have been described above with reference to the accompanying drawings, but those skilled in the art to which the present disclosure pertains may understand that the present disclosure may be implemented in other specific forms without changing the technical spirit or essential features.

Accordingly, it should be understood that the described embodiments are illustrative only and non-limiting in all respects, and the scope of the present disclosure is indicated by the claims to be described below, and all changes or modified forms derived from the meaning and scope of the claims and the equivalent concept should be interpreted as being included in the scope of the present disclosure.

What is claimed is:

1. A swivel joint for connecting hydraulic oil between a lower body of a construction machine and an upper body rotatably supported by the lower body, the swivel joint comprising:

a rotation support body comprising a first body supported by the lower body and a second body rotatably coupled to the first body and configured to rotate together with the upper body when the upper body rotates;

a sensor supported by the rotation support body to detect rotation of the upper body;

a guide pipe has a portion supported on the first body of the rotation support body and another portion disposed inside the second body of the rotation support body, the guide pipe having a hollow interior configured to guide an arrangement of an electrical line between the lower body and the upper body; and a securing bracket configured to secure a position of a part of the sensor and connecting the guide pipe to the part of the sensor.

2. The swivel joint of claim 1, wherein the sensor comprises:

a detector configured to rotate together with the second body; and a relative detector supported by the lower body and configured to provide relative rotation information between the upper body and the lower body to the detector, the relative detector being secured by the securing bracket.

3. The swivel joint of claim 2, wherein
the second body has a through hole therein, and
the guide pipe is disposed in the through hole.

4. The swivel joint of claim 3,
wherein a side of the guide pipe is detachably supported by the first body.

5. The swivel joint of claim 2, further comprising:
a support including a spacer member disposed in parallel in a longitudinal direction of the second body and configured to form an installation space for the detector and the relative detector disposed above the second body.

6. The swivel joint of claim 5, wherein the support further includes a base member between the second body and the spacer member and connecting the second body and the detector.

7. The swivel joint of claim 5, further comprising:
a rotation support supported to the second body by the spacer member and configured to rotate together with the upper body when the upper body rotates.

8. The swivel joint of claim 7, wherein the securing bracket includes:
a bracket support surface supported a surface of the relative detector; and
an upper protrusion protruding from the bracket support surface.

9. The swivel joint of claim 8, wherein the rotation support includes a securing support having a support coupling groove coupled to the upper protrusion.

10. The swivel joint of claim 8, wherein
the second body has a through hole therein,
the guide pipe is disposed in the through hole of the second body,
the securing bracket further includes a center protrusion formed by protruding toward a center portion of a securing through hole defined in the bracket support surface, and
the guide pipe further has a coupling groove formed at one end portion of the guide pipe and coupled to the center protrusion.

11. The swivel joint of claim 1, wherein the rotation support body further comprises a hydraulic guide portion configured to be coupled to a hydraulic line, on an outer circumferential surface of an area of the second body protruding upward with respect to an upper body bottom surface of the upper body supported by the lower body.

12. A construction machine comprising:
a lower body;
an upper body supported by the lower body;
a swing device disposed on the lower body to rotatably support the upper body; and
a swivel joint disposed at a center portion of the swing device, the swivel joint comprising:
a rotation support body comprising a first body supported by the lower body and a second body rotatably coupled to the first body and having one area disposed to protrude with respect to one surface of the upper body to rotate together with the upper body when the upper body rotates;
a sensor supported by the second body protruding with respect to a surface of the upper body and configured to detect rotation of the upper body;
a guide pipe has a portion supported on the first body of the rotation support body and another portion disposed inside the second body of the rotation support body, the guide pipe having a hollow interior configured to guide arrangement of an electrical line between the lower body and the upper body;
a securing bracket configured to secure a position of a part of the sensor and connecting the guide pipe to the part of the sensor; and
a hydraulic guide portion configured to couple a hydraulic line to an outer circumferential surface of an area of the second body.

13. The construction machine of claim 12, wherein
the upper body comprises:
an upper body bottom surface supported by the lower body;
a pair of upper body vertical surfaces spaced apart from each other with respect to the swivel joint, the pair of upper body vertical surfaces protruding from the upper body bottom surface and disposed to cross the upper body bottom surface; and
an upper body reinforcement surface connecting the pair of upper body vertical surfaces to each other and disposed so that an area thereof overlaps the swivel joint when viewed from above over the upper body, and
the sensor is detachable in an upward direction of the upper body bottom surface during maintenance of the sensor.

14. The construction machine of claim 13, wherein the guide pipe having one side disposed to penetrate along a longitudinal direction of the second body, and another side detachably supported by the first body, the guide pipe detachable in a lower direction of the upper body bottom surface during maintenance of the sensor.

15. A swivel joint for connecting hydraulic oil between a lower body of a construction machine and an upper body rotatably supported by the lower body, the swivel joint comprising;
a rotation support body comprising a first body supported by the lower body, and a second body rotatably coupled to the first body and rotating together with the upper body when the upper body rotates;
a detector having a first detection through hole defined therein, and rotating together with the second body;
a relative detector having a second detection through hole defined therein, and supported by the lower body to provide relative rotation information between the upper body and the lower body to the detector;

a second through hole defined inside the second body;

a securing bracket partially inserted inside the second detection through hole to support position of the relative detector; and a guide pipe at least a portion of which is inserted into the second through hole, the first detection through hole, and the second detection through hole, wherein the guide pipe comprises one side supported by the securing bracket inserted into the second detection through hole and another side detachably coupled to the first body.

\* \* \* \* \*